Patent 3,337,355

SOLID FOAMED SULPHUR AND PROCESS FOR THE MANUFACTURE THEREOF

John M. Dale and Allen C. Ludwig, San Antonio, Tex., assignors, by mesne assignments, to Southwest Patents, Inc., San Antonio, Tex., a corporation of Texas
No Drawing. Filed Feb. 4, 1965, Ser. No. 430,458
6 Claims. (Cl. 106—122)

ABSTRACT OF THE DISCLOSURE

This invention relates to solid foamed sulphur and a process for the manufacture thereof. More particularly it relates to such a product and method of manufacture thereof by (a) heating sulphur to above its melting point, (b) blending a stabilizing agent with the molten sulphur, (c) blending a viscosity increaser with the molten sulphur, steps (b) and (c) being performed in any sequence with relation to each other, (d) forming bubbles in the molten sulphur, and (e) cooling the sulphur to below its melting point.

---

This invention relates to solid foamed sulphur and a process for the manufacture thereof and more particularly to a solid foamed sulphur characterized by the absence of large voids.

It has long been believed that if a solid foamed sulphur could be made it would be excellent low-cost cellular building, insulation, and shock resistant material. However, attempts in the past to make a solid foamed sulphur have failed for various reasons including the difficulty of entrapping in the molten sulphur any appreciable amount of gas necessary to form the cellular structure and the inability when such gas has been entrapped to prevent the formation of large voids.

It is a general object of this invention to provide a solid foamed sulphur.

It is another object of the present invention to provide a solid foamed sulphur having blended therein a viscosity increaser and a stabilizing agent.

Another object of the present invention is to provide a process for the manufacture of such solid foamed sulphur.

A further object of the present invention is to provide a process for the manufacture of solid foamed sulphur in which process sulphur is melted, a stabilizing agent and a viscosity increaser are blended in the molten sulphur, bubbles are formed in the molten sulphur, and then the sulphur is cooled to below its melting point.

These and other objects will be apparent from the following description of the presently preferred examples of the invention.

This invention is based upon the discovery that an excellent solid foamed sulphur results if (a) sulphur is heated to above its melting point, (b) a stabilizing agent is blended with the molten sulphur, (c) a viscosity increaser is blended with the molten sulphur, steps (b) and (c) being performed in any sequence with relation to each other, (d) bubbles are formed in the molten sulphur, and (e) the sulphur is cooled below its melting point. The quicker the sulphur is solidified after the bubbles are formed in the molten sulphur the more uniform will be the cellular structure of the solid foam.

The term "transition temperature" as used herein means the temperature above the melting point of sulphur at which the viscosity of molten sulphur begins to sharply increase. At atmospheric pressure the transition temperature for pure sulphur is approximately 150 to 160°. Between its melting point, approximately 110° C. at atmospheric pressure, and the transition temperature, sulphur has a viscosity ranging from 7 to 12 centipoises which is comparable to that of water. When sulphur reaches the transition temperature its viscosity rises rapidly to at least about 160 poises without any appreciable change in temperature, continues rapidly upward to approximately 900 poises at about 190° C., and then begins to decrease. This change in viscosity with increase in temperature is a reversible process and upon the sulphur being cooled from above its transition temperature the viscosity of the sulphur will revert to approximately that of water as the sulphur is cooled from the transition temperature to its melting point. If bubbles are attempted to be formed in the molten sulphur while it is below its transition temperature, such as by the addition of a "blowing agent" (a chemical or chemicals which will decompose at the temperatures and pressures involved and release gas) they will not remain in the molten sulphur because of its low viscosity. If bubbles are formed in the molten sulphur at or above the transition temperature when the viscosity of the molten sulphur is high those bubbles will escape from the molten sulphur as it is cooled below the transition temperature.

This phenomenon of the molten sulphur reverting to low viscosity as its temperature is decreased from the transition temperature is well known in the sulphur industry and for various purposes so-called "viscosity improvers" have been used to increase the viscosity of molten sulphur while it is below the transition temperature. The term "viscosity increaser" as used herein means any of those materials which when added to molten sulphur increases the viscosity of the molten sulphur below the transition temperature.

Generally speaking there are two different acting types of viscosity increasers. One type of viscosity increaser increases the viscosity of molten sulphur while it is below the transition temperature and has relatively little effect upon the viscosity of the sulfur at or above the transition temperature. This type maintains the increased viscosity below the transition temperature regardless of whether the viscosity increaser is added while the molten sulphur is above or below the transition temperature and regardless of whether, after the viscosity increaser is added, the molten sulphur is heated to above the transition temperature and thereafter cooled. Examples of this type of viscosity increaser are phosphorous, arsenic, selenium, and phosphorous sulfides.

The other type of viscosity increaser increases the viscosity of molten sulphur while it is below the normal transition temperature but eliminates most of the increase in viscosity which would occur at the normal transition temperature. Examples of this second type of viscosity increaser are styrene monomer, ethylene disulfide, polysulfide rubbers such as Thiokol A, and polysulfide liquids such as Thiokol LP-3. "Thiokol A" is the trade name for a polyethylene tetrasulfide polymer which is believed to have the chemical formula $(C_2H_4S_4)x$ or $(C_4H_8S_4)x$ and is manufactured by Thiokol Chemical Corporation. "Thiokol LP-3" is a trade name for a liquid polysulfide polymer manufactured by Thiokol Chemical Corporation having the recurring unit $$-S_xCH_2CH_2OCH_2OCH_2CH_2S_x-$$

where $x$ has a value of 4. This polymer is further characterized by a viscosity of 77° F. of approximately 10 poises and a molecular weight of about 1000.

Either type of viscosity increaser may be used. Additionally, various combinations of these viscosity increasers are satisfactory including a combination of viscosity increasers of one type with viscosity increasers of the other type.

Any desired amount of the viscosity increasers may be added so long as there is a sufficient amount to keep the bubbles entrapped within the sulphur while it is above its melting point. Increasing the amount of viscosity increaser reduces, but does not eliminate, the tendency of bubbles in the molten sulphur to flow together and form voids.

The addition of a stabilizing agent prevents bubbles formed in the molten sulphur from flowing together and forming voids. The term "stabilizing agent" as used herein means a finely divided inert material having individual particles which are plate-like in form. Examples of stabilizing agents are ground mica, aluminum pigment, those clays having plate-like particles such as some kaolin or china clays, those talcs having plate-shaped particles such as those sold under the trade names Mistron Vapor and Mistron HGO–55 by Sierra Talc Company, 1608 Huntington Drive, South Pasadena, California, those sands having plate-shaped particles such as silicon oxide sold under the trade name "Min-U-Sil" by Pennsylvania Glass Sand Company, 375 Park Avenue, New York, and those plate-shaped organic pigments such as that sold under the trade name Permanent Yellow which is the coupling product between diazotized p-nitroaniline and acetoacetanilide and that sold under the trade name Hansa Yellow G which has the general formula:

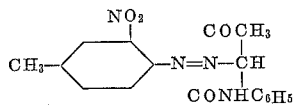

Either one or a combination of the stabilizing agents may be used.

By the stabilizing agent being "inert" is meant that it must not react with the sulphur, the viscosity increaser, or the blowing agent to such a degree that it will decompose either chemically or physically and prevent the formation of voids.

The forming of bubbles in the molten sulphur may be done in any conventional manner for forming foams generally such as those methods used in forming plastic foams. These include (1) mechanically mixing a gas such as air with the molten sulphur, (2) adding a blowing agent, and (3) mixing a liquid with the molten sulphur while maintaining a predetermined pressure on the sulphur and then releasing the pressure on the sulphur sufficiently that the liquid will vaporize at the temperature and lower pressure involved. All of these methods must use material free from substance having a deleterious effect upon the process. For example, most members of the halogen family will decrease the viscosity of the sulphur sufficiently that proper foams will not be formed. Examples of blowing agents that are satisfactory are a combination of sodium carbonate or bicarbonate and acid, N,N'-dimethyl N-N' dinitrosoterephthalamide sold under the trade name Nitrosan, sodium bicarbonate dispersed in a neutral oil sold under the trade name Unicel S, and N-N', dinitrosopentamethylenetetramine sold under the trade name Unicel ND. Nitrosan, Unicel S, and Unicel ND are products of E. I. du Pont de Nemours & Co.

The stabilizing agent and viscosity increaser may be mixed with the molten sulphur either above or below the transition temperature and may be added simultaneously or in any order with respect to each other. Preferably the viscosity increaser is added at temperatures at or above the transition temperature because a chemical reaction takes place between the sulphur and some of the viscosity increasers and this reaction takes place quicker at higher temperatures. At or above the transition temperature it is completed in approximately 15 minutes.

Preferably the viscosity increaser is $P_2S_5$ and the stabilizing agent is Mistron Vapor.

Set forth below are presently preferred examples of the best contemplated method and product of the present invention. In each of the examples the solid foam sulphur had a cellular structure formed by the bubbles of the blowing agent and was characterized by the absence of large voids.

*Example one*

| Ingredients: | Pounds |
|---|---|
| Sulphur | 100 |
| Mistron Vapor | 10 |
| Styrene monomer | 3 |
| $P_2S_5$ | 3 |
| $CaCO_3$ | 2 |
| $H_3PO_4$ | 1.4 |

A melting tank was charged with 100 pounds of sulphur and heated by indirect heat until the sulphur melted. All the styrene and 2 pounds of $P_2S_5$ were mixed by a mechanical agitator with the molten sulphur at 160° C. for one hour. The remaining 1 pound of $P_2S_5$, the Mistron Vapor, the $CaCO_3$ and $H_3PO_4$ were then added to the blend and mechanically mixed for approximately 10 minutes. During this last 10 minutes a lid was secured on the melting tank so that the pressure resulting from the heat and the molten foam which formed almost instantly was allowed to build up. The pressure increased to 40 p.s.i.g. by the end of the 10 minutes and this pressure was used to force the molten foam out of an outlet valve on the tank and into a mold where it solidified. The density of the foam produced by this process was approximately 27 pounds per cubic foot. Non-foamed sulphur has a density of approximately 120 pounds per cubic foot.

*Example two*

| Ingredients: | Parts by weight |
|---|---|
| Sulphur | 200 |
| $P_2S_5$ | 10 |
| Mistron Vapor | 10 |
| $CaCO_3$ | 2 |
| $H_3PO_4$ | 1.5 |

The sulphur was first melted and heated to 180° C.±5° C. The $P_2S_5$ was added, thoroughly mixed, and allowed to react for 15 minutes; the Mistron Vapor and calcium carbonate were added and thoroughly mixed; and the $H_3PO_4$ was then added and dispersed with a mechanical mixer. The molten foam immediately formed and was poured into a mold and allowed to solidify. All this was carried out at atmospheric pressure.

*Example three*

| Ingredients: | Parts by weight |
|---|---|
| Sulphur | 200 |
| $P_2S_5$ | 4 |
| Ethylene disulfide | 4 |
| Styrene monomer | 1 |
| Mistron Vapor | 20 |
| $CaCO_3$ | 2 |
| $H_3PO_4$ | 1.5 |

The sulphur was melted and heated to 150° C.±5° C.; the $P_2S_5$, ethylene disulfide, and styrene monomer were thoroughly mixed and allowed to react for approximately 30 minutes; the Mistron Vapor and $CaCO_3$ were added and thoroughly mixed; and then the $H_3PO_4$ was added and thoroughly mixed. The liquid foam formed almost immediately and was poured into a mold and allowed to solidify. All this was carried out at atmospheric pressure.

From the foregoing discussion, examples, and description of the invention, it is apparent that the objects set forth herein as well as others have been achieved. Those skilled in the art will recognize that the principles of this invention may be applied in several ways, only a few of which have been exemplified herein specifically. Accordingly, the invention is to be limited only by the spirit thereof and the scope of the appended claims.

What is claimed is:

1. The process of making foamed sulphur comprising
(a) heating sulphur to above its melting point, (b) blending a stabilizing agent with the molten sulphur,
(c) blending a viscosity increaser with the molten sulphur, steps (b) and (c) being taken in either order with respect to each other,
(d) forming bubbles in the molten sulphur, and
(e) cooling the molten sulphur to below its melting point.

2. The process of claim 1 in which the viscosity increaser is selected from the class consisting of phosphorous, arsenic, selenium, phosphorous sulfides, styrene monomer, ethylene disulfide, and polysulfide rubbers and liquids.

3. The process of claim 1 in which the stabilizer agent is selected from the class consisting of ground mica, aluminum pigment, kaolin, china clay, talcs having plate-shaped particles, sands having plate-shaped particles, Permanent Yellow organic pigment, and Hansa Yellow G pigment.

4. The process of claim 1 in which the viscosity increaser includes $P_2S_5$.

5. The process of claim 2 in which the stabilizing agent includes a talc having plate-shaped particles.

6. The process of claim 1 in which the viscosity increaser is selected from the class consisting of phosphorous, arsenic, selenium, phosphorous sulfides, styrene monomer, ethylene disulfide, and polysulfide rubbers and liquids and in which the stabilizer agent is selected from the class consisting of ground mica, aluminum pigment, kaolin, china clay, talcs having plate-shaped particles, sands having plate-shaped particles, Permanent Yellow organic pigment, and Hansa Yellow G pigment.

References Cited

UNITED STATES PATENTS

| | | | |
|---|---|---|---|
| 1,959,026 | 5/1934 | Hamor | 106—70 |
| 2,046,871 | 7/1936 | Duecker et al. | 106—70 |
| 2,079,943 | 5/1937 | Lobdell | 260—79.1 |
| 2,161,245 | 6/1939 | Cain et al. | 106—70 |

OTHER REFERENCES

Rexford Newcomb, Jr.: "Ceramic Whitewares," 1947 (p. 59).

Heinrich Ries: "Clays," 1906 (pp. 97 and 98).

ALEXANDER H. BRODMERKEL, *Primary Examiner.*

T. MORRIS, *Assistant Examiner.*